Sept. 7, 1937.                H. C. A. POTEZ                2,092,424
DEVICE FOR OPERATING THE CONTROL SURFACES OF FLYING MACHINES
                Filed Oct. 20, 1936           2 Sheets-Sheet 1

Sept. 7, 1937. H. C. A. POTEZ 2,092,424
DEVICE FOR OPERATING THE CONTROL SURFACES OF FLYING MACHINES
Filed Oct. 20, 1936 2 Sheets-Sheet 2
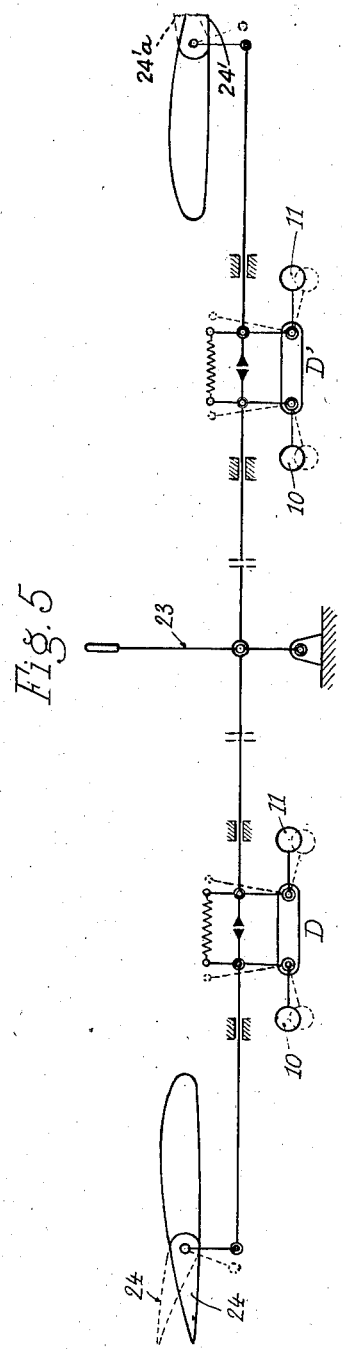
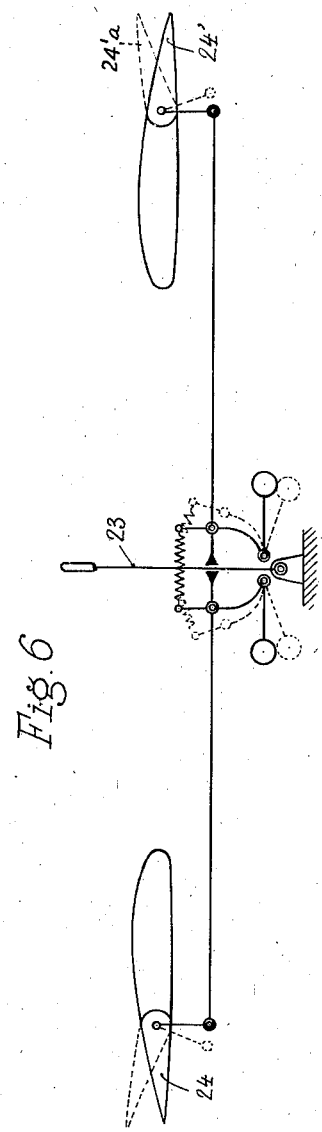

Patented Sept. 7, 1937

2,092,424

UNITED STATES PATENT OFFICE 2,092,424

DEVICE FOR OPERATING THE CONTROL SURFACES OF FLYING MACHINES

Henry Charles Alexandre Potez, Meaulte, France

Application October 20, 1936, Serial No. 106,625
In France October 25, 1935

4 Claims. (Cl. 244—76)

The maximum speed of flying machines appears to be limited, not by technical possibilities, but by the physiological conditions to which the pilot and the passengers are subjected during the evolutions of the flying machine, and such evolutions, whether brought about by the pilot or not, may cause accelerations which cannot be resisted by the human organism.

The present invention has for its object improvements in devices for operating the control surfaces of flying machines, which improvements are chiefly characterized by the fact that the operating device is provided with means by which the maximum acceleration due to an evolution of the flying machine can be limited to a given value.

According to one embodiment of the invention, the said means consist of one or more masses which are statically balanced by spring means or the like, said mass or masses being connected with the operating device in such way as to actuate this device by their inertia, and hence to actuate the control surface or surfaces in a direction producing a retardation (i. e., a negative acceleration), when the acceleration produced by an evolution of the aeroplane shall exceed a determined maximum value.

The operating device can be positively connected with the control surface or surfaces, and in this case, the mass or masses will act simultaneously upon the operating device and upon the control surface or surfaces.

The operating device can also be connected with the control surface or surfaces by one or more spring means having a given power, against which the inertia of one or more masses will act, and thus if the pilot should hold his control operating member in a fixed position, the action of the inertia of the said mass or masses will only move the control surface or surfaces in the direction producing a retardation.

The invention will now be described with reference to the accompanying drawings in which.

Figs. 5 and 6 relate to applications of the invention to wing-flaps.

Figure 1:
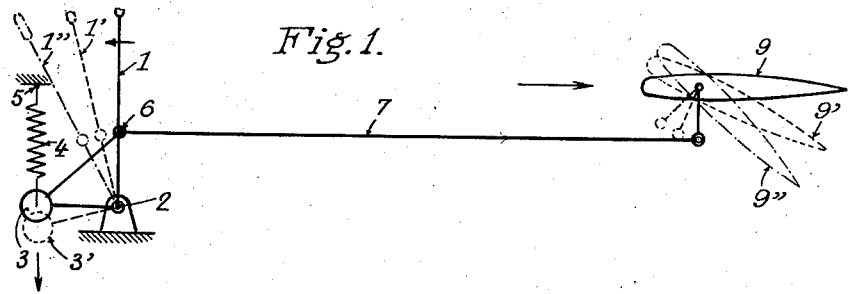
Fig. 1 is a diagrammatic view showing the construction of a device for operating a tail control surface, improved in accordance with the invention.

In the embodiment represented in Fig. 1, the lever I which is pivoted on the fixed axle 2 and serves to operate a tail control surface, carries a pendular mass 3 which is statically balanced by a spring 4 secured to a fixed point 5 and calibrated at a determined value. To this lever I is pivoted at 6 a rod 7 actuating one of the control surfaces, for instance an elevator 9.

It will be observed that under the effect of an acceleration produced by the operation of the operating lever by the pilot, which lever moves from position I″ to position I, while the said control surface moves from position 9″ to position 9, the force of inertia upon the pendular mass 3 may be greater than the initial tension of the spring. The said mass will proceed to the point 3′, and the operating lever I will be moved towards the front of the flying machine at I′. This movement causes a variation of the incidence of the elevator 9, which proceeds to the point 9′ and thus varies the trajectory of the flying machine in the contrary direction to the movement causing the acceleration. Thus the action of the pendular mass will automatically produce a retardation.

Figure 2:
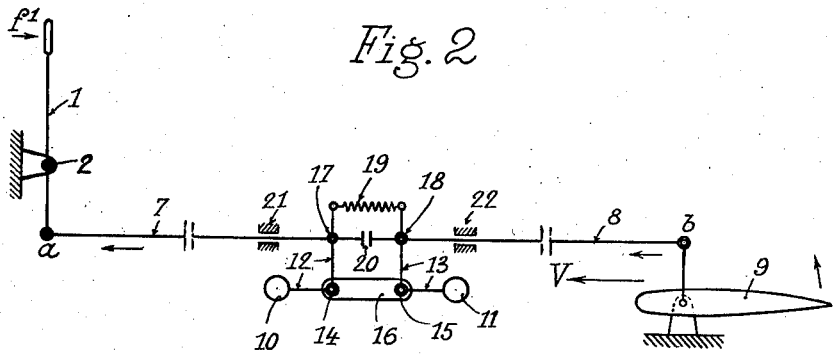
Figs. 2, 3 and 4 are diagrammatic views showing, in different positions, a modification of the said device.

The device shown in Fig. 2 is based upon the same principle, but the modification of the incidence causes no movement of the operating lever, in order that there shall be no disturbance in the reaction of the lever in the pilot's hand.

In this second embodiment, the operating lever I, which is pivoted at 2, acts at *a* upon a rod consisting of two portions 7 and 8. The portion 8 is pivoted at *b* to the elevator 9. The two portions of said rod are connected together by the limiting device. This latter has the following construction. Two pendular masses 10 and 11 are respectively secured to one arm of bell-crank levers 12 and 13. These two levers are pivoted respectively at 14 and 15 to a suspended shackle 16. The other arm of the lever 12 is pivoted at 17 to the rod 7; the lever 13 is pivoted at 18 to the rod 8. The ends of the arms 12—13 are connected together by a spring 19 the initial tension of which is preliminarily regulated, or by a like elastic device. The rods 7 and 8 are placed end to end and in contact at 20, and are held in this position by the spring 19.

Two bearings 21—22 support the weight of the whole device, and provide for the sliding of the rods 7—8.

Figure 3:
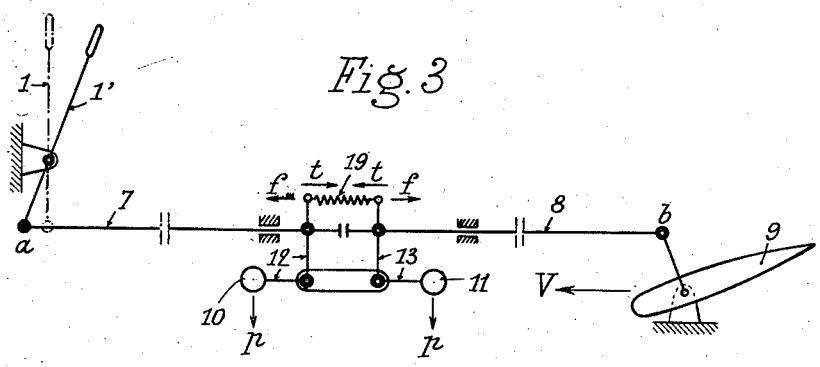

Fig. 3 represents the device in operation, in the case in which the acceleration has not exceeded the limit determined by the spring 19. The pilot moves the lever I in the direction of the arrow $f^1$, and brings it into the position I′ in order to stall the flying machine. The force of inertia *p* of the pendular masses 10—11 is manifested by a stress $f$ upon the ends of the levers 12—13. But since the tension $t$ of the spring 19 is greater than $f$, the portions 7 and 8 of the connecting rod will remain in contact at the ends, and the distance $a$—$b$ will be constant. The corresponding control surface thus moves in the direction desired by the pilot in order to stall the flying machine with reference to the initial direction V.

Figure 4:
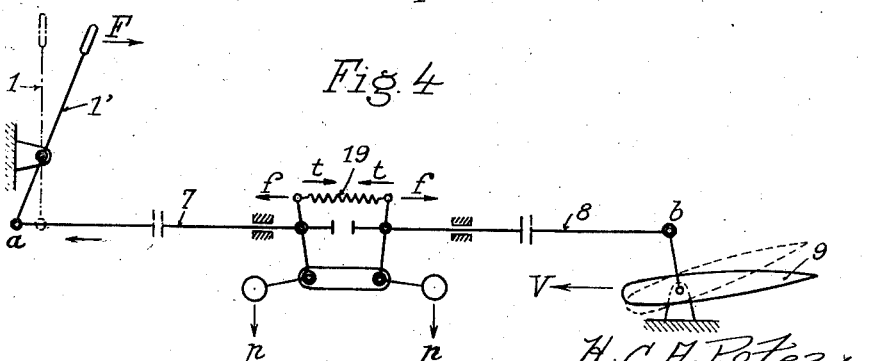

This change of the flight path of the flying machine may cause an acceleration which exceeds the one for which the spring 19 is adjusted. Figure 4 shows the position assumed by the limiting device in this case. The stresses $f$ due to the forces $p$ now exceed the initial tension $t$ of the spring. The portions 7 and 8 of the connecting rod will separate, hence increasing the distance between the points $a$ and $b$. If the point $a$ remains stationary, i. e., if the pilot uses a force F to maintain the lever 1 in the position 1', the point $b$ will be repelled owing to the difference between the forces $f$ and $t$. The displacement of the point $b$ will cause a variation of the incidence of the corresponding control surface with reference to the initial direction V, thus varying the path of the flying machine in a direction corresponding to a retardation.

When this latter attains a sufficient value, the spring 19 brings back the portions 7 and 8 of the rod $a$—$b$, and its length returns to the normal value.

Figs. 5 and 6 show the applications of the invention in the case of the control of the wing-flaps, and these applications permit of reducing the stresses on the wings and also of limiting the acceleration due to the action of a gust of wind acting upon the whole or a part of the wing unit.

In the embodiment shown in Fig. 5, two devices D and D' comprising masses, similar to the device shown in Figs. 2 to 4, are mounted on the transmission between the wing warping lever 23 and the wing-flaps 24—24'. In the case of a sudden increase of the thrust of the air upon the wings, the force of inertia acting upon the masses 10—11 will cause an upward movement of the wing-flaps 24—24', to 24a—24'a, and this will reduce the lift coefficient of the wing and hence the total thrust. The device will operate even if the gust of wind acts only upon one side of the wing unit, that is, only upon one wing. In this case, the wing-flap, 24 or 24' corresponding to this wing, will be the only one lifted.

Fig. 6 represents a modification in which a single device is arranged in the neighbourhood of the lever 23 controlling the wing warping. In this case, only the forces of inertia acting at points near the pilot will have an action upon the wing-flaps.

Obviously, the invention is not limited to the embodiments herein described and represented, which are given solely by way of example.

Having now described my invention what I claim as new and desire to secure by Letters Patent is:

1. In combination a flying machine, a control surface mounted on said flying machine, an operating member, contractible and expansible connecting means between said operating member and said control surface, spring means inserted in said connecting means and adapted to hold said connecting means in its contracted position and means responsive by its inertia to the acceleration of the flying machine and adapted to bring said connecting means towards its expanded position against the action of said spring means, in a direction causing a retardation of the flying machine when the acceleration exceeds a determined value.

2. In combination a flying machine, a control surface mounted on said flying machine, an operating member, connecting means for connecting said operating member with said control surface comprising two portions arranged end to end and adapted to be brought into and out of contact with each other, two crank levers respectively pivoted by one arm to said portions of said means, a rigid connecting member pivoted to the vertices of said crank levers, a mass secured to the end of the other arm of each of said crank levers, and spring means connected to said crank levers and adapted to bring said two portions into contact with each other.

3. In combination a flying machine, two wing flaps mounted on said flying machine, connecting means between said wing flaps comprising two portions arranged in line, an operating lever disposed between the abutting ends of the two portions of said connecting means, two crank levers adapted to rotate about their stationary vertices and respectively pivoted by one arm to said portion of said means, a mass secured to the end of the other arm of each of said crank levers, and spring means connected to said crank levers and adapted to bring said two portions into contact with said operating lever.

4. In combination a flying machine, on each wing of said flying machine means adapted to change the lift of the wing, connecting means between said first mentioned means comprising two portions arranged in line, an operating lever disposed between the abutting ends of the two portions of said connecting means, two crank levers adapted to rotate about their stationary vertices and respectively pivoted by one arm to said portions of said means, a mass secured to the end of the other arm of each of said crank levers, and spring means connected to said crank levers and adapted to bring said two portions into contact with said operating lever.

HENRY CHARLES ALEXANDRE POTEZ.